(12) United States Patent
Sethi et al.

(10) Patent No.: US 12,056,625 B2
(45) Date of Patent: Aug. 6, 2024

(54) DETERMINATION OF STORAGE CONFIGURATION FOR ENTERPRISE DISTRIBUTED ENVIRONMENT

(71) Applicant: Dell Products L.P., Round Rock, TX (US)

(72) Inventors: Parminder Singh Sethi, Ludhiana (IN); Suren Kumar, Kavanur (IN)

(73) Assignee: Dell Products L.P., Round Rock, TX (US)

( * ) Notice: Subject to any disclaimer, the term of this patent is extended or adjusted under 35 U.S.C. 154(b) by 1012 days.

(21) Appl. No.: 16/983,221

(22) Filed: Aug. 3, 2020

(65) Prior Publication Data

US 2022/0036224 A1 Feb. 3, 2022

(51) Int. Cl.
*G06N 5/04* (2023.01)
*G06F 18/2415* (2023.01)
*G06N 7/01* (2023.01)

(52) U.S. Cl.
CPC .......... *G06N 7/01* (2023.01); *G06F 18/24155* (2023.01); *G06N 5/04* (2013.01); *G06F 2213/0028* (2013.01)

(58) Field of Classification Search
CPC ....... G06F 18/24155; G06N 7/01; G06N 5/04
See application file for complete search history.

(56) References Cited

U.S. PATENT DOCUMENTS

| | | | |
|---|---|---|---|
| 7,152,142 B1 | 12/2006 | Guha et al. | |
| 8,782,341 B1 * | 7/2014 | Niranjan | G06F 3/067 711/114 |
| 9,594,633 B2 | 3/2017 | Colgrove et al. | |
| 10,257,275 B1 * | 4/2019 | Dirac | H04L 67/1097 |
| 2002/0091746 A1 | 7/2002 | Umberger et al. | |
| 2011/0173326 A1 * | 7/2011 | Lambert | G06F 9/5061 709/226 |
| 2013/0168341 A1 | 7/2013 | Yogev | |
| 2013/0332697 A1 * | 12/2013 | Hiwatashi | G06F 3/0607 711/E12.002 |
| 2019/0265890 A1 * | 8/2019 | Barajas Gonzalez | G06F 3/0604 |

(Continued)

OTHER PUBLICATIONS

Alipourfard, Omid, et al. "{CherryPick}: Adaptively unearthing the best cloud configurations for big data analytics." 14th USENIX Symposium on Networked Systems Design and Implementation (NSDI 17). 2017. (Year: 2017).*

(Continued)

*Primary Examiner* — Hal Schnee
(74) *Attorney, Agent, or Firm* — Ryan, Mason & Lewis, LLP

(57) ABSTRACT

A method comprises collecting data from a computing environment comprising one or more storage devices, wherein the data comprises information identifying assignments of the one or more storage devices to one or more servers in the computing environment. In the method, the data is analyzed using one or more machine learning algorithms, wherein the analyzing comprises predicting whether a given configuration of the one or more storage devices in combination with the one or more servers is a specified configuration. The method also includes generating a storage configuration recommendation for a user based on the analysis, and transmitting the storage configuration recommendation to the user.

20 Claims, 11 Drawing Sheets

(56) References Cited

U.S. PATENT DOCUMENTS

2021/0132844 A1* 5/2021 Shang .................. G06F 3/064
2021/0216351 A1* 7/2021 Chaterji ................ G06N 20/20
2021/0406146 A1* 12/2021 Lange ................ G06F 11/3068

OTHER PUBLICATIONS

Techopedia, "Server Chassis," https://www.techopedia.com/definition/2167/server-chassis, Accessed Jul. 21, 2020, 5 pages.
Wikipedia, "Blade Server," https://en.wikipedia.org/w/index.php?title=Blade_server&oldid=956221278, May 12, 2020, 7 pages.
A. Saeed, "Good News!!!! VMware vSphere 6.5 Now Supports 512e Drives," https://blogs.vmware.com/...0bytes'%20sectors.&text=Thus%2C%20the%20firmware%20of%20these,or%20512B%20Emulation%20(512e), Dec. 13, 2016, 6 pages.
Wikipedia, "Naive Bayes Classifier," https://en.wikipedia.org/w/index.php?title=Naive_Bayes_classifier&oldid=970942633, Aug. 3, 2020, 11 pages.
M. Rouse, "Raid 0 (disk striping)" https://searchstorage.techtarget.com/definition/RAID-0-disk-striping, Accessed Jul. 22, 2020, 10 pages.

* cited by examiner

ComputerName : WIN-7IDL09S0UDS
ImageName    : svchost.exe
PID          : 1484
Session#     : 0
MemUsage     : 3,836 K
Status       : Unknown
UserName     : NT AUTHORITY\SYSTEM
CPUTime      : 0:00:00

ComputerName : WIN-7IDL09S0UDS
ImageName    : svchost.exe
PID          : 1508
Session#     : 0
MemUsage     : 27,792 K
Status       : Unknown
UserName     : NT AUTHORITY\SYSTEM
CPUTime      : 0:00:05

ComputerName : WIN-7IDL09S0UDS
ImageName    : fontdrvhost.exe
PID          : 1532
Session#     : 1
MemUsage     : 8,084 K
Status       : Unknown
UserName     : Font Driver Host\UMFD-1
CPUTime      : 0:00:01
```

FIG. 7

```
IP: 100.102.240.22
Sub: 255.255.255.0
Gate:    100.102.240.3

100.97.62.143
100.97.62.147

$ getversion
<Server>  <iDRAC Version>   <Blade Type>                  <Gen>   <Updatable>
server-1  4.10.10.10 (23)   PowerEdge M640 (VRTX)         iDRAC9  Y
server-2  4.10.10.10 (23)   PowerEdge M640 (VRTX)         iDRAC9  Y
server-3  4.10.10.10 (23)   PowerEdge M640 (VRTX)         iDRAC9  Y
server-4  4.10.10.10 (23)   PowerEdge M640 (VRTX)         iDRAC9  Y <Switch>  <Model Name>                       <HW Version>  <FW Version>
switch-1  R1-2401 VRTX 1Gb Switch Module     A01           2.0.0.75

<CMC>   <CMC Version>                  <Updatable>
cmc-1   3.30.111.20191120 0154         Y
cmc-2   3.30.111.20191120 0154         Y <Chassis Infrastructure>    <FW Version>                <FQDD>
Main Board                  2.21.A00.20151030 2495      System.Chassis.1#Infra
structure.1

<Storage Controller>              <FW Version>      <FQDD>
Shared PERC8                      23.14.06.0013     RAID.ChassisIntegrated
.1-1
Shared PERC8                      23.13.16.0015     RAID.ChassisSlot.5-1

<Storage Enclosure>               <FW Version>      <FQDD>
VRTX3.5x12 0:0                    2.00              Enclosure.Internal.0-0
:RAID.ChassisIntegrated.1-1

<Physical Disk>                                     <FW Version>      <FQDD>
Physical Disk 0:0:0                                 ES68              Disk.Bay.0:Enclosure.I
nternal.0-0:RAID.ChassisIntegrated.1-1
Physical Disk 0:0:10                                ES68              Disk.Bay.10:Enclosure.
Internal.0-0:RAID.ChassisIntegrated.1-1
Physical Disk 0:0:11                                E820              Disk.Bay.11:Enclosure.
Internal.0-0:RAID.ChassisIntegrated.1-1
Physical Disk 0:0:2                                 ES68              Disk.Bay.2:Enclosure.I
nternal.0-0:RAID.ChassisIntegrated.1-1
Physical Disk 0:0:6                                 ES68              Disk.Bay.6:Enclosure.I
nternal.0-0:RAID.ChassisIntegrated.1-1
Physical Disk 0:0:7                                 ES68              Disk.Bay.7:Enclosure.I
nternal.0-0:RAID.ChassisIntegrated.1-1
Physical Disk 0:0:8                                 GS15              Disk.Bay.8:Enclosure.I
nternal.0-0:RAID.ChassisIntegrated.1-1
Physical Disk 0:0:9                                 ES68              Disk.Bay.9:Enclosure.I
nternal.0-0:RAID.ChassisIntegrated.1-1
Solid State Disk 0:0:1                              D339              Disk.Bay.1:Enclosure.I
nternal.0-0:RAID.ChassisIntegrated.1-1
```

FIG. 8

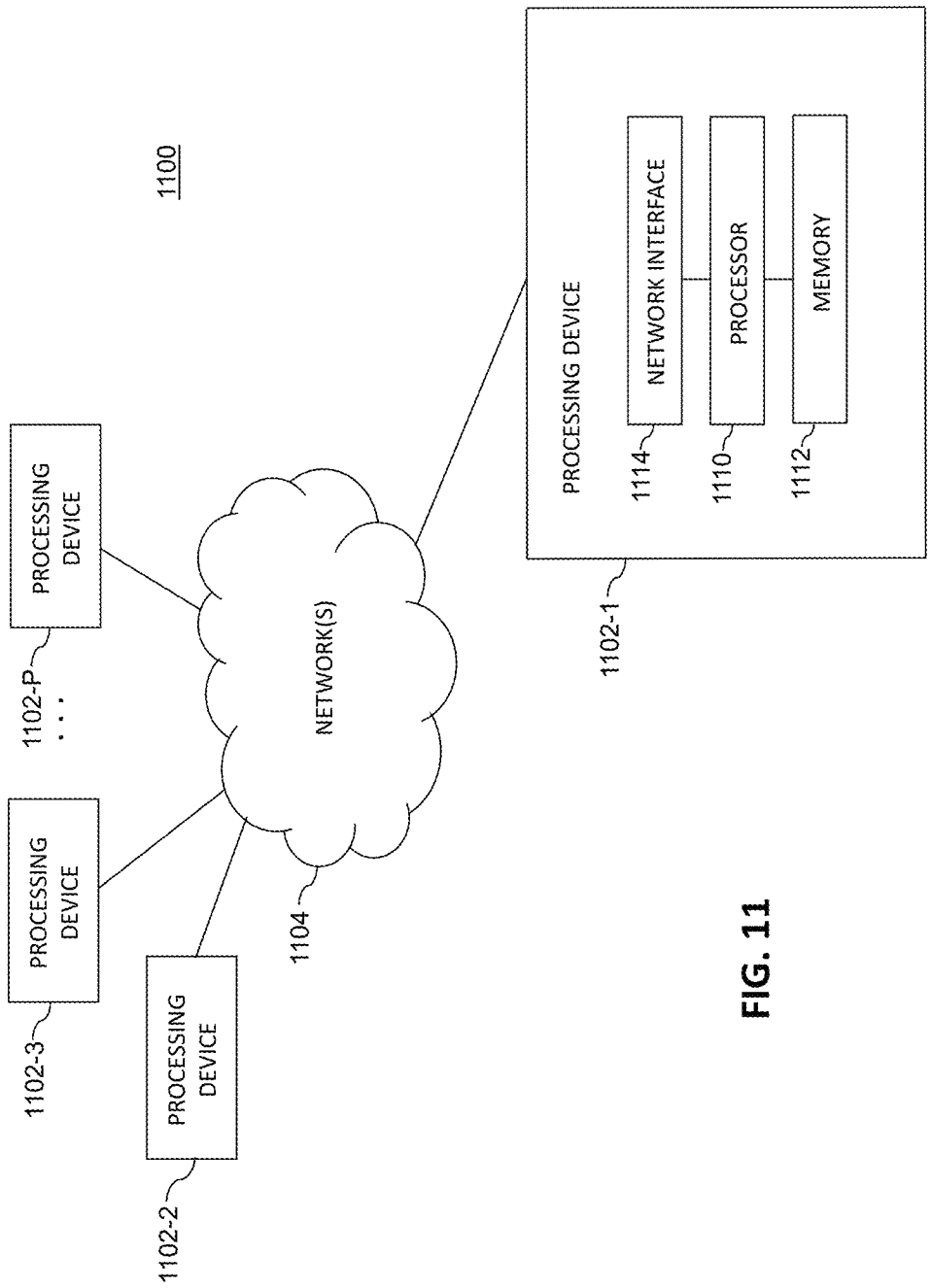

DETERMINATION OF STORAGE CONFIGURATION FOR ENTERPRISE DISTRIBUTED ENVIRONMENT

FIELD

The field relates generally to information processing systems, and more particularly to state information collection associated with devices in information processing systems.

BACKGROUND

Data centers can include modular servers, which provide a hardware configuration that accommodates a relatively large number of storage devices and facilitates centralized storage management of multiple servers. Components of a modular server include, for example, a chassis, blade servers and a storage pool. The chassis is a structure for housing or physically assembling servers in different configurations. A chassis can accommodate multiple servers, storage devices and other peripheral equipment. Servers can include, for example, blade servers, which are physical servers that work independently. One or more of the blade servers may run management software. A storage pool comprises multiple storage devices such as, for example, multiple hard disk drives (HDDs) similar to a JBOD ("just a bunch of drives") configuration.

In conventional techniques, an administrator determines which and the number of storage devices of a plurality of storage devices to be assigned to each of a plurality of servers. The administrator can increase or decrease the number of storage devices based on need. In generating the storage device assignments, the administrator must predict the storage needs for each server. However, all of the storage devices may not necessarily be utilized in accordance with the administrator's predictions. In response, an administrator may be required to increase and/or decrease storage sizes for particular servers, and/or add additional storage devices and reconfigure storage settings. Current approaches for management of storage resources for modular servers or other types of data center configurations, which are based on reactive analysis by an administrator of server usage and workload, are highly inefficient and prone to errors.

SUMMARY

Illustrative embodiments provide techniques for implementing machine learning techniques to efficiently allocate storage resources and recommend certain types of storage resources based on the needs of system components.

In one embodiment, a method comprises collecting data from a computing environment comprising one or more storage devices, wherein the data comprises information identifying assignments of the one or more storage devices to one or more servers in the computing environment. In the method, the data is analyzed using one or more machine learning algorithms, wherein the analyzing comprises predicting whether a given configuration of the one or more storage devices in combination with the one or more servers is a specified configuration. The method also includes generating a storage configuration recommendation for a user based on the analysis, and transmitting the storage configuration recommendation to the user.

Further illustrative embodiments are provided in the form of a non-transitory computer-readable storage medium having embodied therein executable program code that when executed by a processor causes the processor to perform the above steps. Still further illustrative embodiments comprise an apparatus with a processor and a memory configured to perform the above steps.

These and other features and advantages of embodiments described herein will become more apparent from the accompanying drawings and the following detailed description.

BRIEF DESCRIPTION OF THE DRAWINGS

FIG. 6 depicts example pseudocode for data collection according to an illustrative embodiment.

FIG. 7 depicts an example listing of collected data corresponding to tasks and/or applications running on computers in a computing environment in an illustrative embodiment.

FIG. 8 depicts chassis management controller (CMC) firmware details according to an illustrative embodiment.

FIGS. 10 and 11 show examples of processing platforms that may be utilized to implement at least a portion of an information processing system according to illustrative embodiments.

DETAILED DESCRIPTION

Figure 1:
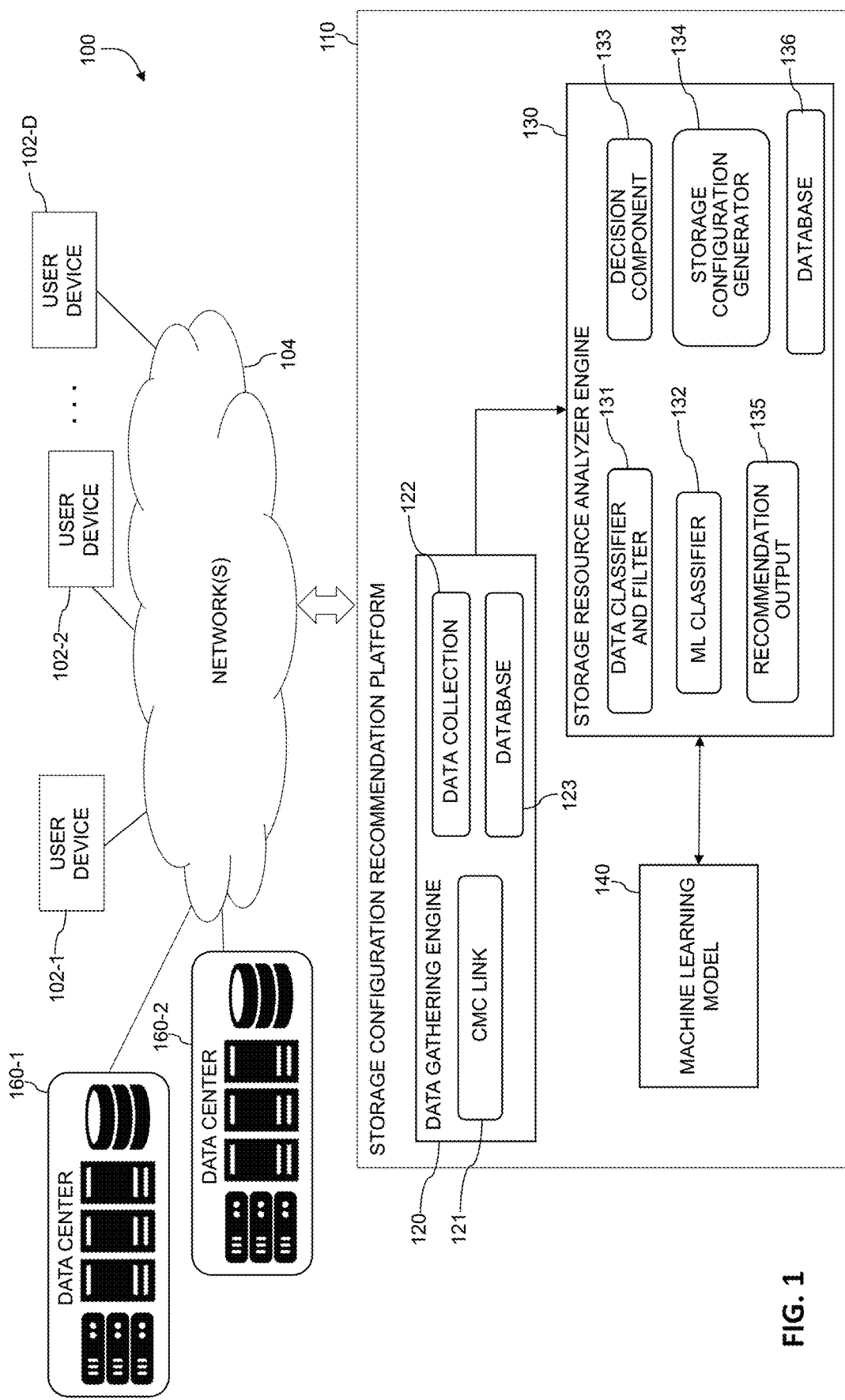
FIG. 1 depicts details of an information processing system with a storage configuration recommendation platform for automatically generating storage configuration recommendations for computing environments according to an illustrative embodiment.

Illustrative embodiments will be described herein with reference to exemplary information processing systems and associated computers, servers, storage devices and other processing devices. It is to be appreciated, however, that embodiments are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other type of cloud-based system that includes one or more clouds hosting tenants that access cloud resources. Such systems are considered examples of what are more generally referred to herein as cloud-based computing environments. Some cloud infrastructures are within the exclusive control and management of a given enterprise, and therefore are considered "private clouds." The term "enterprise" as used herein is intended to be broadly construed, and may comprise, for example, one or more businesses, one or more corporations or any other one or more entities, groups, or organizations. An "entity" as illustratively used herein may be a person or system. On the other hand, cloud infrastructures that are used by multiple enterprises, and not necessarily controlled or managed by any of the multiple enterprises but rather respectively controlled and managed by third-party cloud providers, are typically considered "public clouds." Enterprises can choose to host their applications or services on private clouds, public clouds, and/or a combination of private and public clouds (hybrid clouds) with a vast array of computing resources attached to or otherwise a part of the infrastructure. Numerous other types of enterprise computing and storage systems are also encompassed by the term "information processing system" as that term is broadly used herein.

As used herein, "real-time" refers to output within strict time constraints. Real-time output can be understood to be instantaneous or on the order of milliseconds or microseconds. Real-time output can occur when the connections with a network are continuous and a user device receives messages without any significant time delay. Of course, it should be understood that depending on the particular temporal nature of the system in which an embodiment is implemented, other appropriate timescales that provide at least contemporaneous performance and output can be achieved.

Illustrative embodiments provide a unique method to find optimal storage resource distribution using machine learning algorithms. The machine learning algorithms rely on system data including, but not necessarily limited to, alerts, logs, error messages, sensor and external data, product and parts configuration data, supply chain data, and service history. The embodiments use one or more machine learning techniques to predict a probability whether a current storage resource configuration is optimal. In the event a determination is made that the storage resource configuration is not optimal, a new configuration will be compared with the current configuration to determine whether the new configuration is an improvement over the previous configuration. In connection with the addition, replacement or removal of storage devices, the embodiments re-calculate the probability of whether the modified storage configuration is optimal. The system data of a computing environment will be constantly monitored to detect system changes and make predictions based on real-time system status.

In an illustrative embodiment, a storage resource analyzer engine (SRAE) trains a Naïve Bayes classifier (e.g., Gaussian Naïve Bayes classifier) and a supervised learning model with usage data from a computing environment such as, for example, a data center, and uses the trained classifier and model to generate storage resource configuration recommendations for the computing environment. The usage data comprises, for example, chassis and/or serial attached small computer system interface (SCSI) controller ("SAS controller") data, storage controller data, storage device usage and server inventory associated with the computing environment. The SRAE also recommends suitable storage devices to use (e.g., HDDs or solid-state drives (SSDs)) based on the runtime workload patterns (e.g., sequential or random) of a server.

FIG. 1 shows an information processing system 100 configured in accordance with an illustrative embodiment. The information processing system 100 comprises user devices 102-1, 102-2, . . . 102-D (collectively "user devices 102"). The user devices 102 communicate over a network 104 with a storage configuration recommendation platform 110.

The user devices 102 can comprise, for example, Internet of Things (IoT) devices, desktop, laptop or tablet computers, mobile telephones, or other types of processing devices capable of communicating with the storage configuration recommendation platform 110 and each other over the network 104. Such devices are examples of what are more generally referred to herein as "processing devices." Some of these processing devices are also generally referred to herein as "computers." The user devices 102 may also or alternately comprise virtualized computing resources, such as virtual machines (VMs), containers, etc. The user devices 102 in some embodiments comprise respective computers associated with a particular company, organization or other enterprise. The variable D and other similar index variables herein such as L and P are assumed to be arbitrary positive integers greater than or equal to two.

The terms "client", "customer" or "user" herein are intended to be broadly construed so as to encompass numerous arrangements of human, hardware, software or firmware entities, as well as combinations of such entities. Storage configuration recommendation services may be provided for users utilizing one or more machine learning models, although it is to be appreciated that other types of infrastructure arrangements could be used. At least a portion of the available services and functionalities provided by the storage configuration recommendation platform 110 in some embodiments may be provided under Function-as-a-Service ("FaaS"), Containers-as-a-Service ("CaaS") and/or Platform-as-a-Service ("PaaS") models, including cloud-based FaaS, CaaS and PaaS environments.

Although not explicitly shown in FIG. 1, one or more input-output devices such as keyboards, displays or other types of input-output devices may be used to support one or more user interfaces to the storage configuration recommendation platform 110, as well as to support communication between the storage configuration recommendation platform 110 and connected devices (e.g., user devices 102) and/or other related systems and devices not explicitly shown.

Users may refer to customers, clients and/or administrators of the computing environments for which storage resources are being configured. For example, in some embodiments, the user devices 102 are assumed to be associated with repair technicians, system administrators, information technology (IT) managers, software developers release management personnel or other authorized personnel configured to access and utilize the storage configuration recommendation platform 110.

The information processing system 100 further includes data center 160-1 and data center 160-2 (collectively "data centers 160") connected to the user devices 102 and to the storage configuration recommendation platform 110 via the network 104. The data centers 160 comprise physical devices such as, for example, servers (e.g., modular servers, blade servers, etc.), switches, storage pools comprising, for example, storage arrays and corresponding storage devices, chassis, etc., which are connected over one or more networks like network 104 and/or through direct wired connections. The storage configuration recommendation platform 110 generates storage configuration recommendations for the data centers 160 for users such as, for example, data center administrators, so that the users can approve a recommended optimal storage configuration given by the platform 110, or the system 100 may automatically implement the recommended storage configuration. Although data centers 160 are shown in FIG. 1, the embodiments are not necessarily limited thereto. For example, a data center is one example of a computing environment for which the storage configuration recommendation platform 110 is configured to generate a storage configuration recommendation. The storage configuration recommendation platform 110 can generate storage configuration recommendations for any computing environment comprising devices connected to each other over one or more networks and/or through direct wired connections. Moreover, although two data centers 160-1 and 160-2 are shown, the embodiments are not necessarily limited thereto, and more or less data centers 160 may be part of the information processing system 100.

The storage configuration recommendation platform 110 in the present embodiment is assumed to be accessible to the user devices 102, and vice-versa, over the network 104. In addition, the storage configuration recommendation platform 110 and the user devices 102 can access the data centers 160 over the network 104. The network 104 is assumed to comprise a portion of a global computer network such as the Internet, although other types of networks can be part of the network 104, including a wide area network (WAN), a local area network (LAN), a satellite network, a telephone or cable network, a cellular network, a wireless network such as a WiFi or WiMAX network, or various portions or combinations of these and other types of networks. The network 104 in some embodiments therefore comprises combinations of multiple different types of networks each comprising processing devices configured to communicate using Internet Protocol (IP) or other related communication protocols.

As a more particular example, some embodiments may utilize one or more high-speed local networks in which associated processing devices communicate with one another utilizing Peripheral Component Interconnect express (PCIe) cards of those devices, and networking protocols such as InfiniBand, Gigabit Ethernet or Fibre Channel. Numerous alternative networking arrangements are possible in a given embodiment, as will be appreciated by those skilled in the art.

The storage configuration recommendation platform 110, on behalf of respective infrastructure tenants each corresponding to one or more users associated with respective ones of the user devices 102 provides a platform for automatically generating customized storage configuration recommendations, which are tailored to each data center 160.

Referring to FIG. 1, the storage configuration recommendation platform 110 comprises a data gathering engine 120, a storage resource analyzer engine 130 and a machine learning model 140. The data gathering engine 120 includes a chassis management controller (CMC) link component 121, a data collection component 122 and a database 123. The storage resource analyzer engine 130 includes a data classifier and filter component 131, a machine learning (ML) classifier 132, a decision component 133, a storage configuration generator 134, a recommendation output component 135 and a database 136.

Figure 2:
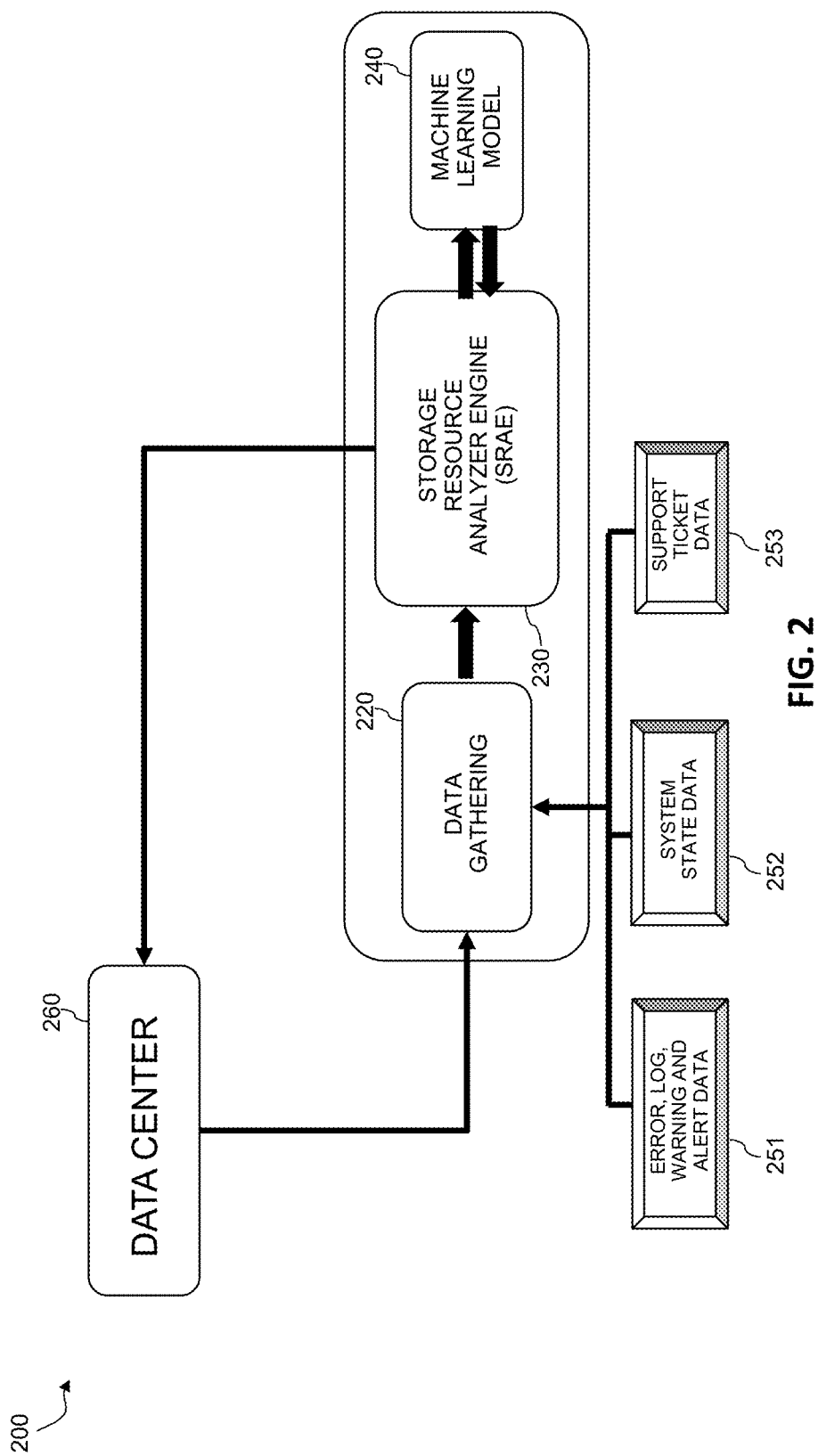
FIG. 2 depicts details of an operational flow for automatically generating storage configuration recommendations according to an illustrative embodiment.

Referring to the system 100 in FIG. 1 and to the operational flow 200 in FIG. 2, according to one or more embodiments, data gathering engine 120/220 collects data from devices of a data center 160-1, 160-2 or 260. In an embodiment, the data gathering engine 120 is integrated with one or more chassis management controllers (CMCs) of the data centers 160. The CMCs comprise embedded system management hardware and software to manage, for example, servers, networking and storage of data centers 160. The data collection component 122 collects data from the data centers 160 and, more specifically from the CMCs via one more existing communication paths between one or more chassis and one or more servers. The data collection component 122 may have complete access to chassis and servers using one or more application programming interface protocols such as, for example, Redfish® representational state transfer (REST) protocol.

FIG. 8 depicts CMC firmware details 800 according to an illustrative embodiment. As can be seen in FIG. 8, the data from a CMC may include (i) server identifying information (e.g., integrated Dell® Remote Access Controller (iDRAC) version, blade type, generation and whether the server is updatable); (ii) switch information (e.g., model name, hardware version and firmware version); (iii) CMC data (e.g., CMC version and whether the CMC is updatable); (iv) chassis information (e.g., infrastructure, firmware version and Fully Qualified Device Descriptor (FQDD)); (v) storage controller information (e.g., firmware version and FQDD); (vi) storage enclosure information (e.g., firmware version and FQDD); and (vii) storage device information (e.g., type of storage device, firmware version and FQDD).

The collected raw data is classified and filtered by a data classifier and filter component 131 of storage resource analyzer engine (SRAE) 130/230. According to one or more embodiments, the data collected by the data collection component 122 comprises information identifying assignments of the one or more storage devices to one or more servers in a computing environment, such as, for example, a data center 160/260. In a non-limiting illustrative example, a modular server of a data center comprises a plurality (e.g., 6) of blade servers and a plurality (e.g., 2) of storage pools (e.g., JBODs). In this illustrative example, each storage pool can accommodate up to 16 HDDs for a total of 32 HDDs. The HDD assignments comprise, for example, 6 HDDs to each of the first 4 blade servers, and 4 HDDs to each of the last 2 blade servers.

Under conventional approaches, administrators are required to manually predict the storage needs for each server and determine the storage device (e.g., HDD) assignments to each server. However, not all of the storage devices will be used as per the administrators' predictions due to erroneous assumptions and/or unforeseen circumstances affecting storage resource use.

The data collected by the data collection component 122 further comprises one or more runtime workload patterns of the one or more servers. For example, sequential and random access are two types of workload patterns. A sequential workload pattern refers to when reading or writing of data occurs in blocks one after the other in sequential order of the data blocks (e.g., from/to a first block, then a second block, then a third block, etc.). A random workload pattern refers to when reading or writing does not occur in data blocks in an order of the data blocks and varies between blocks (e.g., from/to a first block, then a fifth block, then a third block, etc.).

According to one or more embodiments, the SRAE 130/230 and the machine learning model 140/240 are equipped with knowledge that HDD performance is better for sequential workload patterns than for random workload patterns, and that SSD performance, when compared with HDD performance, is better for sequential and random workload patterns. Accordingly, as described in more detail herein, if there are both HDDs and SSDs in a storage pool, a storage configuration recommendation will assign HDDs to servers with sequential workload patterns, and SSDs to servers using random workload patterns. The SRAE 130/230 has the intelligence to recommend the suitable storage devices based on the runtime workload patterns of the corresponding servers.

The data collected by the data collection component 122 further comprises SAS controller data and storage controller data. In one or more embodiments, an internal storage pool and external storage devices connect to one or more SAS controllers. The SAS controllers enable users to assign storage devices to a server and the assigned storage devices will be accessed by their corresponding servers through a storage controller such as, for example, a PowerEdge® redundant array of independent disks (RAID) controller ("PERC"). Accordingly, SAS and storage controller data includes identifying information about storage device inventory, server inventory (e.g., servers in a chassis), assignments of storage devices to particular servers, storage device usage data (e.g., volume/amount of storage space used, types of files being stored, latency, etc.), applications being executed on the servers, RAID level data, sector size data and storage device type data. Although such data may be collected from SAS and storage controllers, the data is not limited to be collected from such sources, and may be collected from other available sources.

Figure 4:
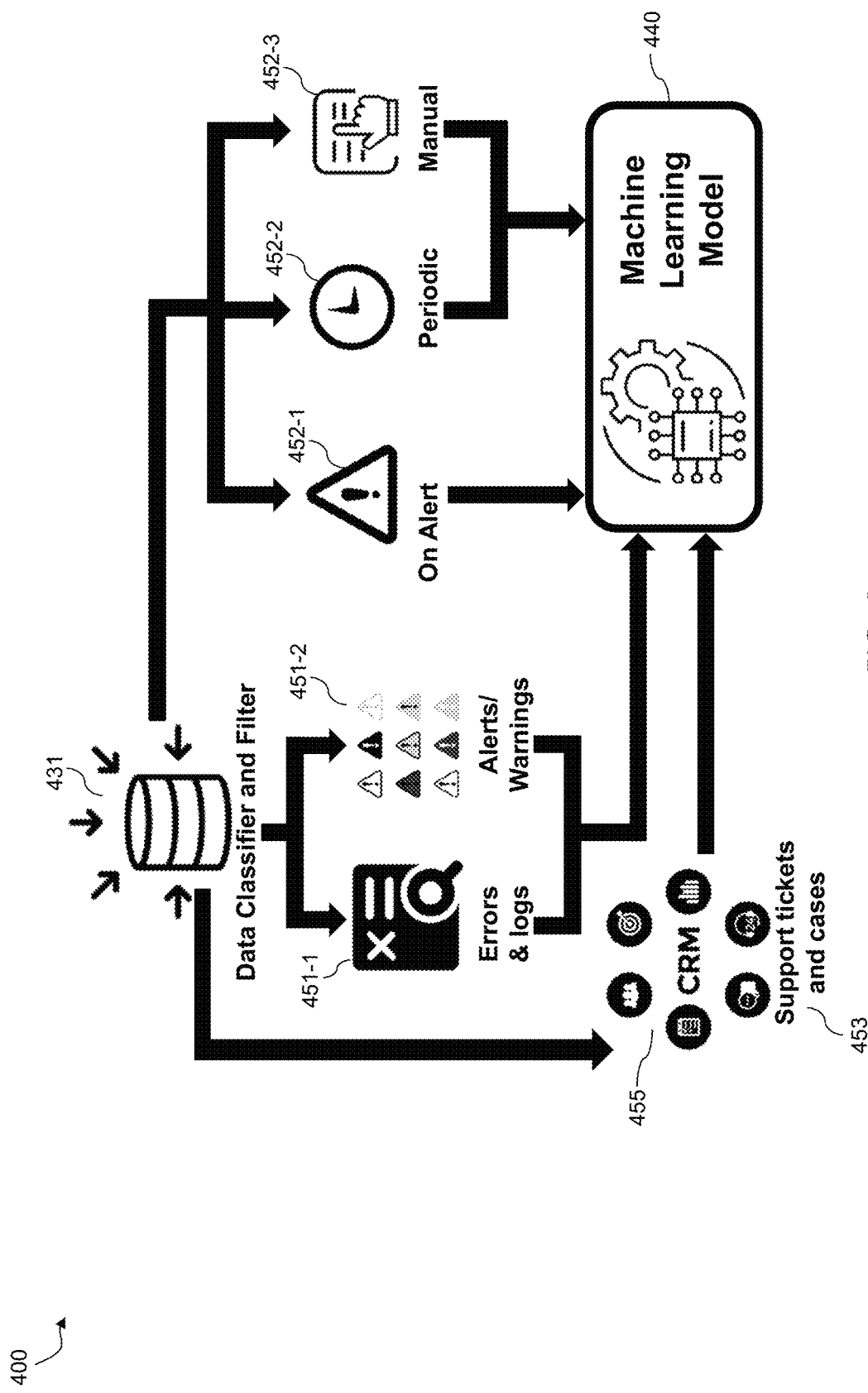
FIG. 4 depicts details of data classification and filtering according to an illustrative embodiment.

The data collected by the data collection component 122 further comprises telemetry data, such as, for example error data, alert data, activity log data, warnings data, system state data and technical support ticket data. Referring to FIGS. 1, 2 and 4, the data gathering engine 120/220 is further configured to collect and receive error, log, warning and alert data 251, system state data 252 and support tickets data 253. The error, log, warning and alert data 251 comprises alerts, warnings, errors and/or logs detected on the devices from the data centers 160. The system state data 252 can be obtained from system state information collections from devices of the data centers 160 obtained via collection protocols. The support tickets data 253 comprises technical support ticket and case data in connection with technical support matters, and may be retrieved from, for example, enterprise customer relationship management (CRM) devices and/or databases.

Referring to FIG. 4, the data classifier and filter component 431 classifies and filters the error, log, warning and alert data, system state data and support tickets and cases data. For example, the error, log, warning and alert data includes the errors and/or logs 451-1 from the devices of the data centers, and alerts and/or warnings 451-2 detected from the devices of the data centers 160. The devices of the data centers 160 can be remotely monitored using IT administrative devices, and may be devices associated with an enterprise. Errors, logs, warnings and alerts may be segregated to have a proper view of the data.

The system state data includes on-alert and periodic system state information collections 452-1 and 452-2 that are triggered automatically, and manual system state information collections 452-3 that are manually triggered, such as, for example, user-initiated collections. The on-alert system state collections 452-1 are automatically triggered in response to an alert received from one of the devices (e.g., storage devices, servers, etc.) in a data center. The on-alert system state collections 452-1 correspond to, for example, detected problems on one or more components of a data center device. For example, whenever there is any hardware failure or unexpected occurrence, an alert will be generated, and automated on-alert system state collections 452-1 will be triggered. The periodic system state collections 452-2 are automatically triggered based on a scheduled data collection, such as for example, a data collection that has been programmed to occur at a specific time daily, weekly, etc.

The support tickets and cases data 453 originates from technical support personnel using, for example, technical support devices. In one embodiment, the technical support personnel create tickets and/or cases when system state collections do not contain the attributes that are necessary for troubleshooting a component issue. Such tickets and/or cases may be generated, for example, when IT administrators or other users inform technical support personnel of problems with data center devices and/or a lack of information to fix component issues on the data center devices. The tickets and/or cases from the technical support personnel may be from multiple communication channels, such as, for example, website, email, live chat, social media and telephone sources, and may be compiled by a CRM engine 455, which can be a backend system of an enterprise.

As can be seen in FIG. 4, the data from the different sources 451, 452 and 453 is transmitted to a machine learning model 440. As explained further herein in connection with FIGS. 1-3, the data from the different sources 251/451, 252/452 and/or 253/453 can be used in combination with data output by the SRAE 130/230/330 to train a machine learning model 140/240/340/440. The data collected by the data gathering engine 120 may be stored in one or more databases 123.

Referring back to FIG. 1, the collected raw data is classified and filtered by a data classifier and filter component 131 of the SRAE 130. Data from the data gathering engine 120 is input into the data classifier and filter component 131, which filters the data and tags and/or classifies the data into different categories. For example, storage devices may be categorized according to RAID level (e.g., 0, 1, 5, 6, 10, 50, 60), sector size (e.g., 512N, 512E, 4 KN), storage device type (e.g., HDD, SSD, serial AT attachment (SATA), non-volatile memory express (NVMe)) and storage type (e.g., internal or external). Additional data categories include, for example, controller cache policy and application data type. The SRAE 130 analyzes storage needs according to each category in combination with runtime workload parameters and usage data to determine optimal storage configurations. The data classifier and filter component 131 filters the data in such a way that the required information from big un-structured and structured data sets is collected from the data center devices and other sources (e.g. telemetry data as described herein) and sorted for analysis in the SRAE 130/230/330.

Figure 3:
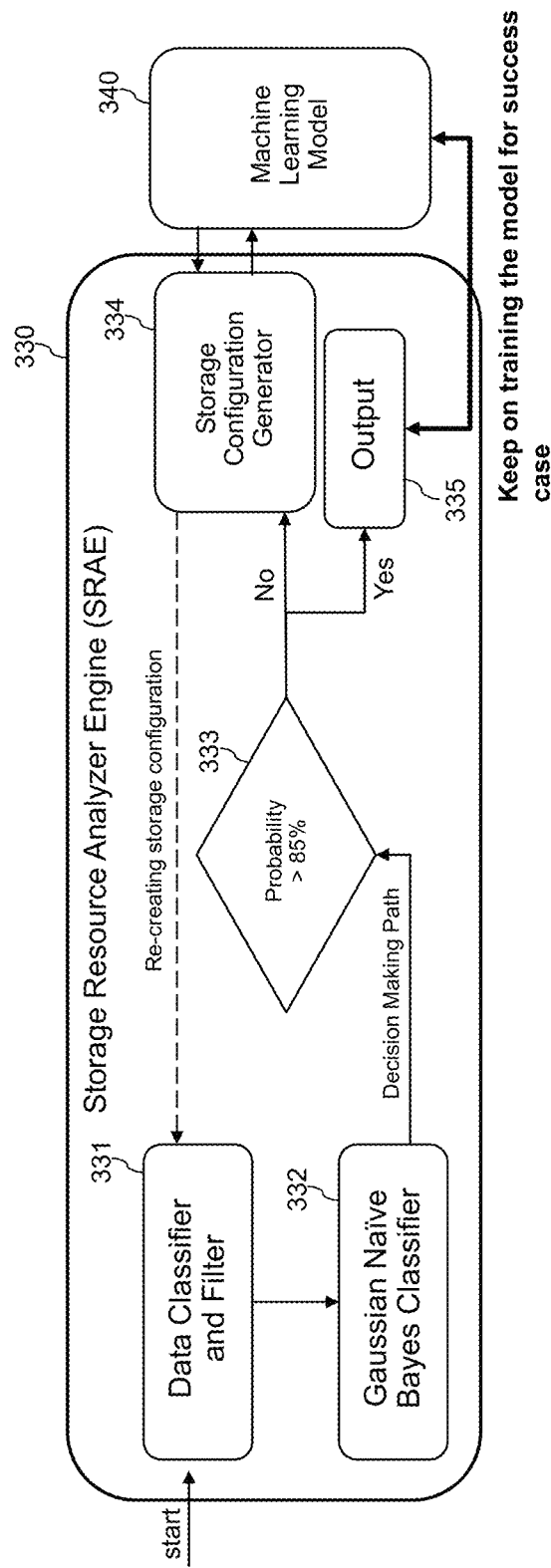
FIG. 3 depicts details of a storage resource analyzer engine according to an illustrative embodiment.

In more detail, referring to FIGS. 1, 2 and 3, the data from the data gathering engine 120/220 is input to the SRAE 130/230/330 where the data is classified and filtered as described herein by the data classifier and filter component 131/331. The SRAE 130/230/330, which recommends an optimal storage resource configuration for a computing environment, After classification, tagging and filtering the data into different categories as explained herein, the data classifier and filter component 131/331 sends the data to a machine learning classifier 132, which may be a Gaussian Naïve Bayes classifier 332 as shown in FIG. 3. The embodiments are not necessarily limited to use of a Gaussian Naïve Bayes classifier, and the machine learning classifier can comprise, for example, another type of Naïve Bayes classifier or other probabilistic machine learning models, stochastic neural networks and/or generative neural networks.

According to an embodiment, the classifier 132/332 executes a probability finder that determines whether there is a predetermined probability (e.g., "x %" probability) that a current configuration of a data center 160 is an optimal configuration. The model used by the Gaussian Naïve Bayes classifier 332 is based on the following equation (1):

$$P(A \mid B) = \frac{P(B \mid A)P(A)}{P(B)} \quad (1)$$

According to equation (1), A and B are events, and P(A) is the priori (prior probability) of event A (i.e., the probability of the event before evidence is seen. The evidence is an attribute value of an unknown instance (here, it is event B). P(A|B) is a posteriori probability of B (i.e., probability of the event after the evidence is seen). In general, the classifier 132/332 is predicting the probability of event A, given the event B is true. The classifier 132/332 finds the probability whether a specific configuration of storage resources is optimal. In a non-limiting operational example, if the predicted probability is less than 85%, the SRAE 130/230/330 will work with the machine learning model 140/240/340/440 to create a new storage configuration and evaluate the new configuration using the classifier 132/332 again to determine the probability using the new configuration. The threshold for a determination of an optimal storage configuration is not necessarily limited to 85%, and other thresholds may be used.

Referring to FIGS. 1 and 3, the probability determination from the classifier 132/332 is sent to the decision component 133/333. The decision component 133/333 determines whether the threshold probability value has been met or exceeded. For example, in the non-limiting operational illustration, if the determined probability is greater than or equal to 85%, then the decision component 133/333 will consider the storage configuration being currently tested as an optimal storage configuration for the corresponding servers in their particular states. If the predicted probability is less than the threshold (e.g., less than 85%), using the machine learning model 140/240/340/440, the storage configuration generator 134/334 generates a new storage configuration. As shown in FIG. 3, the data corresponding to the newly created storage configuration from the storage configuration generator 334 is input to the data classifier and filter component 331 so that the process for determining probability can be repeated in connection with the newly created storage configuration to determine whether the newly created storage configuration is an optimal configuration. This process may be repeated again until an optimal configuration is found.

Once an optimal configuration is found (i.e., probability exceeds a given threshold), the configuration corresponding to the optimal configuration is provided to the machine learning model 140/340/440 via an output component 335 for further training on what is an optimal configuration. Failed (i.e., non-optimal) storage configurations are also provided to the machine learning model 140/340/440 as training data for further training on what is an optimal configuration. In addition, the recommendation output component 135 (and output component 335) are configured to transmit the optimal configuration to a user (e.g., an administrator) for approval to use in the data centers 160. The user receives the recommended optimal storage configuration via one of the user devices 102. In addition, the recommended optimal storage configurations are stored in a database 136, which can be accessed by the machine learning model 140.

According to one or more embodiments, a user may approve the recommended optimal storage configuration or the recommended optimal storage configuration is automatically approved and implemented by the system 100. A user may also have the option to modify recommended storage configurations according data center configuration needs.

Figure 5:
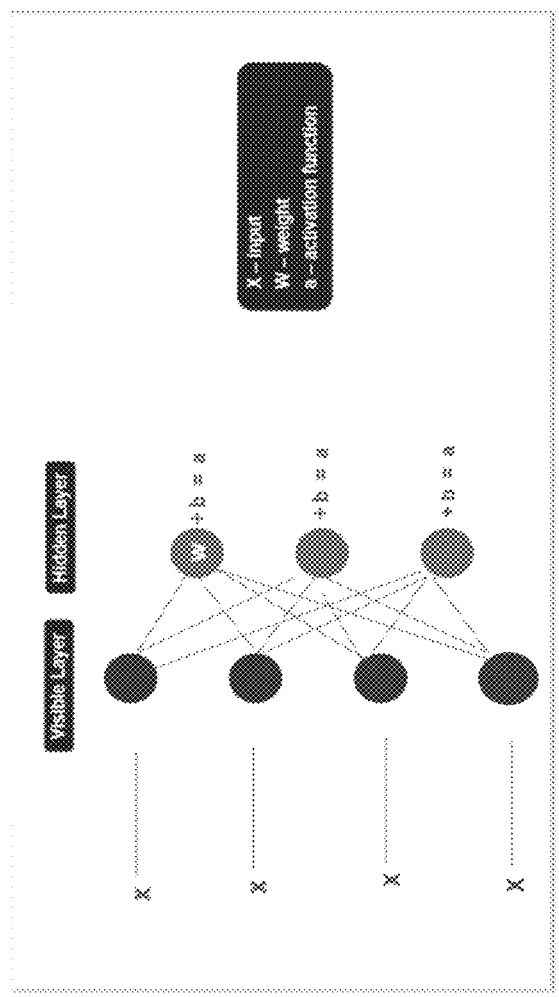
FIG. 5 depicts details of a storage configuration generator according to an illustrative embodiment.

Referring to FIG. 5, a storage configuration generator 534 according to an embodiment comprises a visible layer including visible units/neurons and a hidden layer including hidden units. The units in each layer (represented by circles) have no connections between them within a layer, but are connected to all the other units in the other layer. Connections between the units are bi-directional and symmetric. The storage configuration generator 534 (and 134/334) uses the machine learning model 140/240/340/440, which is trained with multiple optimal storage configurations, with historical telemetry data and/or with different optimal storage configurations present in multiple data centers. The machine learning model 140/240/340/440 is also trained with non-optimal configurations, and continues to learn using the successful and non-successful outputs from the storage configuration generator 134/334/534.

FIG. 6 depicts example pseudocode 600 for collecting server and storage device configuration and usage data from one or more data centers 160 according to an illustrative embodiment, and FIG. 7 depicts an example data report 700 of collected data from one or more data centers 160 corresponding to services and/or applications running on computers in a data center. Referring to FIG. 6, the pseudocode 600 includes commands for retrieving task lists, computer names, process names and process priority. The example data report 700 specifies computer name, image name, process identifier (PID), session number, memory usage, status, user name and CPU time. The PID comprises a unique number identifying a running process in an OS.

According to one or more embodiments, the databases 123 and 136 used by the storage configuration recommendation platform 110 can be configured according to a relational database management system (RDBMS) (e.g., PostgreSQL). Databases 123 and 136 in some embodiments are implemented using one or more storage systems or devices associated with the storage configuration recommendation platform 110. In some embodiments, one or more of the storage systems utilized to implement the databases comprise a scale-out all-flash content addressable storage array or other type of storage array.

The term "storage system" as used herein is therefore intended to be broadly construed, and should not be viewed as being limited to content addressable storage systems or flash-based storage systems. A given storage system as the term is broadly used herein can comprise, for example, network-attached storage (NAS), storage area networks (SANs), direct-attached storage (DAS) and distributed DAS, as well as combinations of these and other storage types, including software-defined storage.

Other particular types of storage products that can be used in implementing storage systems in illustrative embodiments include all-flash and hybrid flash storage arrays, software-defined storage products, cloud storage products, object-based storage products, and scale-out NAS clusters. Combinations of multiple ones of these and other storage products can also be used in implementing a given storage system in an illustrative embodiment.

Although shown as elements of the storage configuration recommendation platform 110, the data gathering engine 120, the SRAE 130 and the machine learning model 140 in other embodiments can be implemented at least in part externally to the storage configuration recommendation platform 110, for example, as stand-alone servers, sets of servers or other types of systems coupled to the network 104. For example, the data gathering engine 120, the SRAE 130 and the machine learning model 140 may be provided as cloud services accessible by the storage configuration recommendation platform 110.

The data gathering engine 120, the SRAE 130 and the machine learning model 140 in the FIG. 1 embodiment are each assumed to be implemented using at least one processing device. Each such processing device generally comprises at least one processor and an associated memory, and implements one or more functional modules for controlling certain features of the data gathering engine 120, the SRAE 130 and/or the machine learning model 140.

At least portions of the storage configuration recommendation platform 110 and the components thereof may be implemented at least in part in the form of software that is stored in memory and executed by a processor. The storage configuration recommendation platform 110 and the components thereof comprise further hardware and software required for running the storage configuration recommendation platform 110, including, but not necessarily limited to, on-premises or cloud-based centralized hardware, graphics processing unit (GPU) hardware, virtualization infrastructure software and hardware, Docker containers, networking software and hardware, and cloud infrastructure software and hardware.

Although the data gathering engine 120, the SRAE 130, the machine learning model 140 and other components of the storage configuration recommendation platform 110 in the present embodiment are shown as part of the storage configuration recommendation platform 110, at least a portion of the data gathering engine 120, the SRAE 130, the machine learning model 140 and other components of the storage configuration recommendation platform 110 in other embodiments may be implemented on one or more other processing platforms that are accessible to the storage configuration recommendation platform 110 over one or more networks. Such components can each be implemented at least in part within another system element or at least in part utilizing one or more stand-alone components coupled to the network 104.

It is assumed that the storage configuration recommendation platform 110 in the FIG. 1 embodiment and other processing platforms referred to herein are each implemented using a plurality of processing devices each having a processor coupled to a memory. Such processing devices can illustratively include particular arrangements of compute, storage and network resources. For example, processing devices in some embodiments are implemented at least in part utilizing virtual resources such as virtual machines (VMs) or Linux containers (LXCs), or combinations of both as in an arrangement in which Docker containers or other types of LXCs are configured to run on VMs.

The term "processing platform" as used herein is intended to be broadly construed so as to encompass, by way of illustration and without limitation, multiple sets of processing devices and one or more associated storage systems that are configured to communicate over one or more networks.

As a more particular example, the data gathering engine 120, the SRAE 130, the machine learning model 140 and other components of the storage configuration recommendation platform 110, and the elements thereof can each be implemented in the form of one or more LXCs running on one or more VMs. Other arrangements of one or more processing devices of a processing platform can be used to implement the data gathering engine 120, the SRAE 130 and the machine learning model 140 as well as other components of the storage configuration recommendation platform 110. Other portions of the system 100 can similarly be implemented using one or more processing devices of at least one processing platform.

Distributed implementations of the system 100 are possible, in which certain components of the system reside in one datacenter in a first geographic location while other components of the system reside in one or more other data centers in one or more other geographic locations that are potentially remote from the first geographic location. Thus, it is possible in some implementations of the system 100 for different portions of the storage configuration recommendation platform 110 to reside in different data centers. Numerous other distributed implementations of the storage configuration recommendation platform 110 are possible.

Accordingly, one or each of the data gathering engine 120, the SRAE 130, the machine learning model 140 and other components of the storage configuration recommendation platform 110 can each be implemented in a distributed manner so as to comprise a plurality of distributed components implemented on respective ones of a plurality of compute nodes of the storage configuration recommendation platform 110.

It is to be appreciated that these and other features of illustrative embodiments are presented by way of example only, and should not be construed as limiting in any way.

Accordingly, different numbers, types and arrangements of system components such as the data gathering engine 120, the SRAE 130, the machine learning model 140 and other components of the storage configuration recommendation platform 110, and the elements thereof can be used in other embodiments.

It should be understood that the particular sets of modules and other components implemented in the system 100 as illustrated in FIG. 1 are presented by way of example only. In other embodiments, only subsets of these components, or additional or alternative sets of components, may be used, and such components may exhibit alternative functionality and configurations.

For example, as indicated previously, in some illustrative embodiments, functionality for the storage configuration recommendation platform can be offered to cloud infrastructure customers or other users as part of FaaS, CaaS and/or PaaS offerings.

Figure 9:
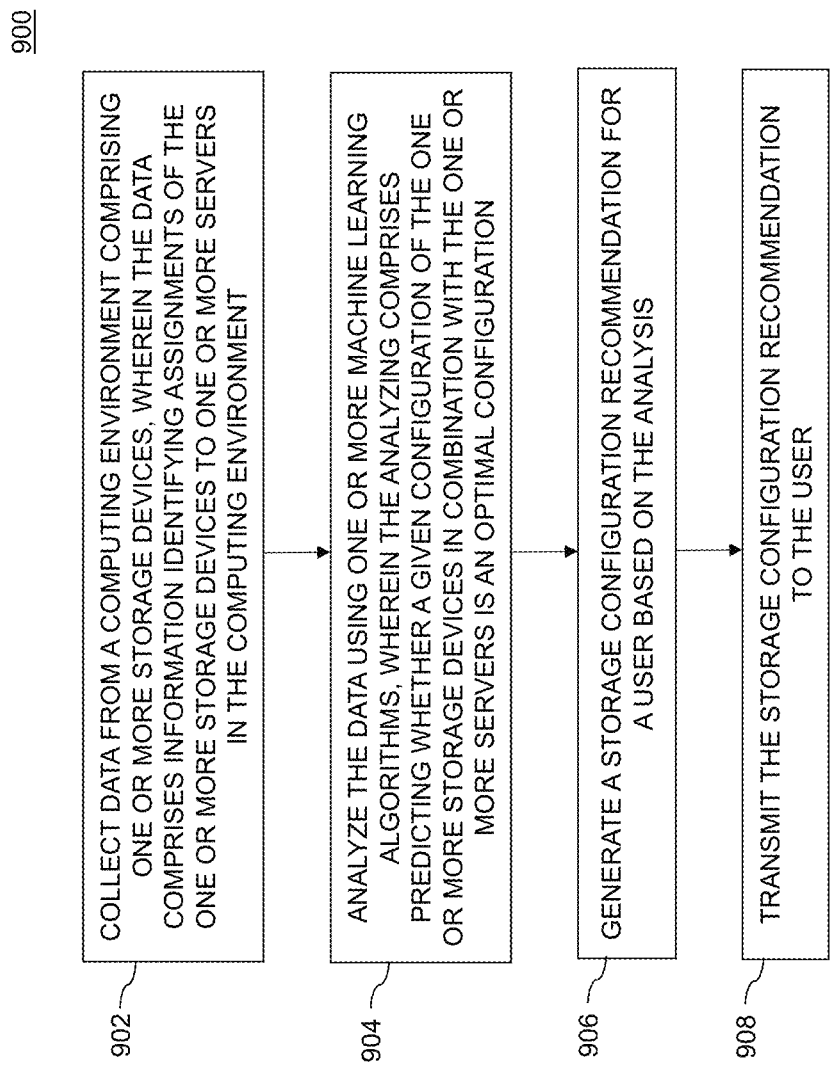
FIG. 9 depicts a process for automatically generating storage configuration recommendations for computing environments according to an illustrative embodiment.

The operation of the information processing system 100 will now be described in further detail with reference to the flow diagram of FIG. 9. With reference to FIG. 9, a process 900 for automatically generating customized storage configuration recommendations as shown includes steps 902 through 908, and is suitable for use in the system 100 but is more generally applicable to other types of information processing systems comprising a storage configuration recommendation platform configured for automatically generating customized storage configuration recommendations.

In step 902, data is collected from a computing environment comprising one or more storage devices. The data comprises information identifying assignments of the one or more storage devices to one or more servers in the computing environment.

In step 904, the data is analyzed using one or more machine learning algorithms. The analyzing comprises predicting whether a given configuration of the one or more storage devices in combination with the one or more servers is an optimal configuration. According to an embodiment, the one or more machine learning algorithms utilize a probabilistic machine learning classifier, such as, but not necessarily limited to, a Naïve Bayes classifier. The predicting comprises inputting the data to the probabilistic machine learning classifier to determine whether the given configuration one of meets and exceeds a probability threshold corresponding to an optimal configuration. As used herein, a "specified configuration" can be an optimal configuration.

In step 906, a storage configuration recommendation for a user is generated based on the analysis, and in step 908, the storage configuration recommendation is transmitted to the user.

In one or more embodiments, the data collected from the computing environment further comprises one or more runtime workload patterns of the one or more servers, and the generating of the storage configuration recommendation comprises recommending one or more storage device types to correspond with the one or more runtime workload patterns of the one or more servers. The one or more runtime workload patterns may comprise, for example, sequential and/or random workload patterns.

In one or more embodiments, the data collected from the computing environment comprises SAS controller data and storage controller data. The data may also comprise error data, alert data, warning data, activity log data and technical support ticket data. A machine learning model may be trained with the error data, alert data, warning data, activity log data and/or technical support ticket data, and the machine learning model is used in connection with generating storage device and server configurations. The machine learning model is configured to be dynamically updated with real-time error data, alert data, warning data, activity log data and technical support ticket data of the computing environment.

In an embodiment, the data collected from the computing environment comprises RAID level data, sector size data and/or storage device type data. The one or more storage devices are categorized according to RAID level, sector size and/or storage device type.

The data can be collected from a chassis management controller over a communication path between a chassis and the one or more servers. In one or more embodiments, the process includes determining that the given configuration is a non-optimal configuration, and generating an additional configuration of the one or more storage devices in combination with the one or more servers responsive to the determination that the given configuration is a non-optimal configuration. The generation of the additional configuration is performed using a machine learning model. The one or more machine learning algorithms is used to predict whether the additional configuration is an optimal configuration.

It is to be appreciated that the FIG. 9 process and other features and functionality described above can be adapted for use with other types of information systems configured to execute storage configuration recommendation services in a storage configuration recommendation platform or other type of platform.

The particular processing operations and other system functionality described in conjunction with the flow diagram of FIG. 9 is therefore presented by way of illustrative example only, and should not be construed as limiting the scope of the disclosure in any way. Alternative embodiments can use other types of processing operations. For example, the ordering of the process steps may be varied in other embodiments, or certain steps may be performed at least in part concurrently with one another rather than serially. Also, one or more of the process steps may be repeated periodically, or multiple instances of the process can be performed in parallel with one another.

Functionality such as that described in conjunction with the flow diagram of FIG. 9 can be implemented at least in part in the form of one or more software programs stored in memory and executed by a processor of a processing device such as a computer or server. As will be described below, a memory or other storage device having executable program code of one or more software programs embodied therein is an example of what is more generally referred to herein as a "processor-readable storage medium."

Illustrative embodiments of systems with a storage configuration recommendation platform as disclosed herein can provide a number of significant advantages relative to conventional arrangements. For example, unlike conventional techniques, the embodiments advantageously use machine learning techniques to provide automated generation of customized storage configuration recommendations tailored to the evolving needs of a particular data center. The embodiments provide functionality for automatically generating customized storage configuration recommendations that are customized for different data centers given specific parameters of operation based on usage data collected from the data centers. The usage data is used to determine whether configurations of storage devices and servers are operating according to predictions made when the configuration was first developed.

Unlike conventional techniques, the embodiments use machine learning techniques to analyze storage resource configurations based on collected runtime data in order to identify and recommend optimal storage resource configurations. The runtime data may be updated in real-time. For example, the embodiments utilize machine learning algorithms to determine whether a current storage configuration is an optimal configuration and to and generate an optimal storage configuration using a machine learning model if the current storage configuration is determined to be non-optimal. The machine learning algorithms rely on numerous data points including, but not necessarily limited to, system telemetry data (e.g., alerts, warnings, logs, errors), storage device assignment and usage data, product and parts configuration data, supply chain data and service history that add different dimensions to the analysis for maximum accuracy.

Advantageously, if new storage devices are being added, replaced or removed from a computing environment, the embodiments input data regarding the added, replaced or removed storage devices, as well as their usage and server assignments, to a machine learning classifier, which computes the probability that the modified storage configuration is optimal. The configuration of a data center or other computing environment is constantly monitored via, for example, one or more links to a CMC, SAS controller and/or a storage controller to retrieve real-time configuration and usage data used for determining whether a configuration is optimal. In addition, as noted above, real-time telemetry data is also considered when determining whether a configuration is optimal and/or when generating a new configuration.

Current approaches also fail to differentiate storage resources according to workload runtime patterns. Advantageously, illustrative embodiments also collect data on one or more runtime workload patterns of the one or more servers, and generating storage configuration recommendations to correspond with the one or more runtime workload patterns of the one or more servers.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

As noted above, at least portions of the information processing system 100 may be implemented using one or more processing platforms. A given such processing platform comprises at least one processing device comprising a processor coupled to a memory. The processor and memory in some embodiments comprise respective processor and memory elements of a virtual machine or container provided using one or more underlying physical machines. The term "processing device" as used herein is intended to be broadly construed so as to encompass a wide variety of different arrangements of physical processors, memories and other device components as well as virtual instances of such components. For example, a "processing device" in some embodiments can comprise or be executed across one or more virtual processors. Processing devices can therefore be physical or virtual and can be executed across one or more physical or virtual processors. It should also be noted that a given virtual device can be mapped to a portion of a physical one.

Some illustrative embodiments of a processing platform that may be used to implement at least a portion of an information processing system comprise cloud infrastructure including virtual machines and/or container sets implemented using a virtualization infrastructure that runs on a physical infrastructure. The cloud infrastructure further comprises sets of applications running on respective ones of the virtual machines and/or container sets.

These and other types of cloud infrastructure can be used to provide what is also referred to herein as a multi-tenant environment. One or more system components such as the storage configuration recommendation platform 110 or portions thereof are illustratively implemented for use by tenants of such a multi-tenant environment.

As mentioned previously, cloud infrastructure as disclosed herein can include cloud-based systems. Virtual machines provided in such systems can be used to implement at least portions of one or more of a computer system and a storage configuration recommendation platform in illustrative embodiments. These and other cloud-based systems in illustrative embodiments can include object stores.

Illustrative embodiments of processing platforms will now be described in greater detail with reference to FIGS. 10 and 11. Although described in the context of system 100, these platforms may also be used to implement at least portions of other information processing systems in other embodiments.

Figure 10:
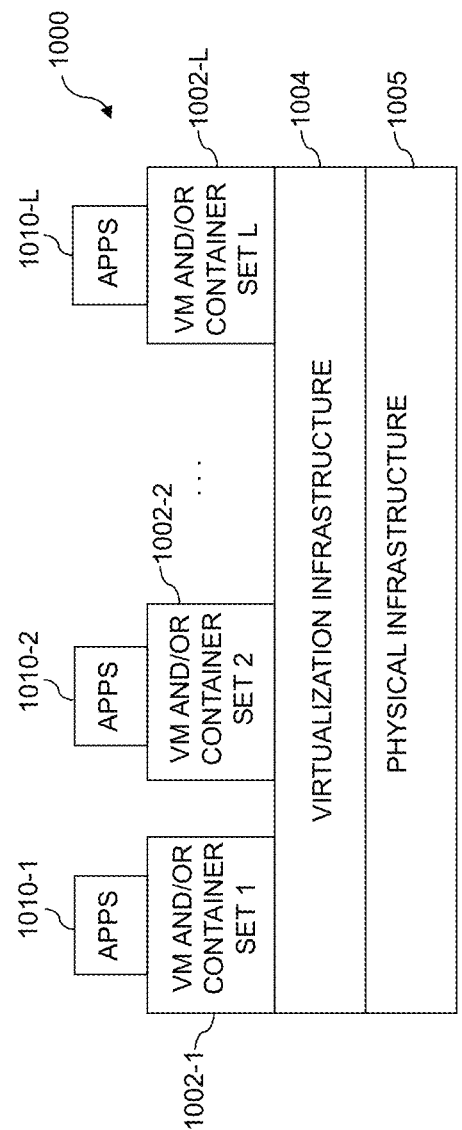

FIG. 10 shows an example processing platform comprising cloud infrastructure 1000. The cloud infrastructure 1000 comprises a combination of physical and virtual processing resources that may be utilized to implement at least a portion of the information processing system 100. The cloud infrastructure 1000 comprises multiple virtual machines (VMs) and/or container sets 1002-1, 1002-2, . . . 1002-L implemented using virtualization infrastructure 1004. The virtualization infrastructure 1004 runs on physical infrastructure 1005, and illustratively comprises one or more hypervisors and/or operating system level virtualization infrastructure. The operating system level virtualization infrastructure illustratively comprises kernel control groups of a Linux operating system or other type of operating system.

The cloud infrastructure 1000 further comprises sets of applications 1010-1, 1010-2, . . . 1010-L running on respective ones of the VMs/container sets 1002-1, 1002-2, . . . 1002-L under the control of the virtualization infrastructure 1004. The VMs/container sets 1002 may comprise respective VMs, respective sets of one or more containers, or respective sets of one or more containers running in VMs.

In some implementations of the FIG. 10 embodiment, the VMs/container sets 1002 comprise respective VMs implemented using virtualization infrastructure 1004 that comprises at least one hypervisor. A hypervisor platform may be used to implement a hypervisor within the virtualization infrastructure 1004, where the hypervisor platform has an associated virtual infrastructure management system. The underlying physical machines may comprise one or more distributed processing platforms that include one or more storage systems.

In other implementations of the FIG. 10 embodiment, the VMs/container sets 1002 comprise respective containers implemented using virtualization infrastructure 1004 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of system 100 may each run on a computer, server, storage device or other processing platform element. A given such element may be viewed as an example of what is more generally referred to herein as a "processing device." The cloud infrastructure 1000 shown in FIG. 10 may represent at least a portion of one processing platform. Another example of such a processing platform is processing platform 1100 shown in FIG. 11.

The processing platform 1100 in this embodiment comprises a portion of system 100 and includes a plurality of processing devices, denoted 1102-1, 1102-2, 1102-3, . . . 1102-P, which communicate with one another over a network 1104.

The network 1104 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 1102-1 in the processing platform 1100 comprises a processor 1110 coupled to a memory 1112. The processor 1110 may comprise a microprocessor, a microcontroller, an application-specific integrated circuit (ASIC), a field-programmable gate array (FPGA), a central processing unit (CPU), a graphical processing unit (GPU), a tensor processing unit (TPU), a video processing unit (VPU) or other type of processing circuitry, as well as portions or combinations of such circuitry elements.

The memory 1112 may comprise random access memory (RAM), read-only memory (ROM), flash memory or other types of memory, in any combination. The memory 1112 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 1102-1 is network interface circuitry 1114, which is used to interface the processing device with the network 1104 and other system components, and may comprise conventional transceivers.

The other processing devices 1102 of the processing platform 1100 are assumed to be configured in a manner similar to that shown for processing device 1102-1 in the figure.

Again, the particular processing platform 1100 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

As indicated previously, components of an information processing system as disclosed herein can be implemented at least in part in the form of one or more software programs stored in memory and executed by a processor of a processing device. For example, at least portions of the functionality of one or more components of the storage configuration recommendation platform 110 as disclosed herein are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems and storage configuration recommendation platforms. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A method, comprising:
   collecting data from a computing environment comprising one or more storage devices, wherein the data comprises information identifying assignments of the one or more storage devices to one or more servers in the computing environment;
   analyzing the data using one or more machine learning algorithms, wherein the analyzing comprises predicting whether a given configuration of the one or more storage devices in combination with the one or more servers is a specified configuration;
   generating a storage configuration recommendation for a user based on the analysis;
   transmitting the storage configuration recommendation to the user;
   training one or more machine learning models used in connection with generating storage device and server configurations with training data, wherein the training data comprises a plurality of specified storage configurations and system state data corresponding to one or more alerts generated in connection with operation of the one or more storage devices and the one or more servers; and
   retraining the one or more machine learning models with additional training data comprising a determination of whether the given configuration is the specified configuration;
   wherein predicting whether the given configuration is the specified configuration comprises:
      determining whether the given configuration one of meets and exceeds a probability threshold corresponding to the specified configuration;
      identifying at least one change to the given configuration; and
      re-determining whether the given configuration one of meets and exceeds the probability threshold based on the at least one change, wherein the at least one change comprises a removal of the one or more storage devices from the computing environment; and
   wherein the steps of the method are executed by a processing device operatively coupled to a memory.

2. The method of claim 1, wherein:
   the one or more machine learning algorithms utilize a probabilistic machine learning classifier; and
   predicting whether the given configuration is the specified configuration comprises inputting the data to the probabilistic machine learning classifier to determine and re-determine whether the given configuration one of meets and exceeds the probability threshold.

3. The method of claim 2, wherein the probabilistic machine learning classifier comprises a Naïve Bayes classifier.

4. The method of claim 1, wherein the data further comprises one or more runtime workload patterns of the one or more servers.

5. The method of claim 4, wherein the generating of the storage configuration recommendation comprises recommending one or more storage device types to correspond with the one or more runtime workload patterns of the one or more servers.

6. The method of claim 5, wherein the one or more runtime workload patterns comprise one of a sequential workload pattern and a random workload pattern.

7. The method of claim 1, wherein the data further comprises at least one of serial attached small computer system interface controller data and storage controller data.

8. The method of claim 1, wherein the data further comprises at least one of error data, warning data, activity log data and technical support ticket data.

9. The method of claim 8, wherein the training data further comprises at least one of the error data, warning data, activity log data and technical support ticket data.

10. The method of claim 1, wherein:
   the data further comprises at least one of redundant array of independent disks (RAID) level data, sector size data and storage device type data; and
   the method further comprises categorizing the one or more storage devices according to at least one of RAID level, sector size and storage device type.

11. The method of claim 1, wherein the data is collected from a chassis management controller over a communication path between a chassis and the one or more servers.

12. The method of claim 1, further comprising determining that the given configuration is not the specified configuration.

13. The method of claim 12, further comprising generating an additional configuration of the one or more storage devices in combination with the one or more servers responsive to the determination that the given configuration is not the specified configuration, wherein the generation of the additional configuration is performed using the one or more machine learning models.

14. The method of claim 13, further comprising using the one or more machine learning algorithms to predict whether the additional configuration is the specified configuration.

15. The method of claim 13, further comprising dynamically updating the one or more machine learning models with at least one of error data, warning data, activity log data and technical support ticket data of the computing environment.

16. An apparatus comprising:
a processing device operatively coupled to a memory and configured to:
collect data from a computing environment comprising one or more storage devices, wherein the data comprises information identifying assignments of the one or more storage devices to one or more servers in the computing environment;
analyze the data using one or more machine learning algorithms, wherein the analyzing comprises predicting whether a given configuration of the one or more storage devices in combination with the one or more servers is a specified configuration;
generate a storage configuration recommendation for a user based on the analysis;
transmit the storage configuration recommendation to the user;
train one or more machine learning models used in connection with generating storage device and server configurations with training data, wherein the training data comprises a plurality of specified storage configurations and system state data corresponding to one or more alerts generated in connection with operation of the one or more storage devices and the one or more servers; and
retrain the one or more machine learning models with additional training data comprising a determination of whether the given configuration is the specified configuration;
wherein, in predicting whether the given configuration is the specified configuration, the processing device is configured to:
determine whether the given configuration one of meets and exceeds a probability threshold corresponding to the specified configuration;
identify at least one change to the given configuration; and
re-determine whether the given configuration one of meets and exceeds the probability threshold based on the at least one change, wherein the at least one change comprises a removal of the one or more storage devices from the computing environment.

17. The apparatus of claim 16, wherein:
the one or more machine learning algorithms utilize a probabilistic machine learning classifier; and
in predicting whether the given configuration is the specified configuration, the processing device is configured to input the data to the probabilistic machine learning classifier to determine and re-determine whether the given configuration one of meets and exceeds the probability threshold.

18. The apparatus of claim 17, wherein the processing device is further configured to:
determine that the given configuration is not the specified configuration; and
generate an additional configuration of the one or more storage devices in combination with the one or more servers responsive to the determination that the given configuration is not the specified configuration, wherein the generation of the additional configuration is performed using the one or more machine learning models.

19. An article of manufacture comprising a non-transitory processor-readable storage medium having stored therein program code of one or more software programs, wherein the program code when executed by at least one processing device causes said at least one processing device to perform the steps of:
collecting data from a computing environment comprising one or more storage devices, wherein the data comprises information identifying assignments of the one or more storage devices to one or more servers in the computing environment;
analyzing the data using one or more machine learning algorithms, wherein the analyzing comprises predicting whether a given configuration of the one or more storage devices in combination with the one or more servers is a specified configuration;
generating a storage configuration recommendation for a user based on the analysis;
transmitting the storage configuration recommendation to the user;
training one or more machine learning models used in connection with generating storage device and server configurations with training data, wherein the training data comprises a plurality of specified storage configurations and system state data corresponding to one or more alerts generated in connection with operation of the one or more storage devices and the one or more servers; and
retraining the one or more machine learning models with additional training data comprising a determination of whether the given configuration is the specified configuration;
wherein, in predicting whether the given configuration is the specified configuration, the program code further causes said at least one processing device to perform the steps of:
determining whether the given configuration one of meets and exceeds a probability threshold corresponding to the specified configuration;
identifying at least one change to the given configuration; and
re-determining whether the given configuration one of meets and exceeds the probability threshold based on the at least one change, wherein the at least one change comprises a removal of the one or more storage devices from the computing environment.

20. The article of manufacture of claim 19, wherein:
the one or more machine learning algorithms utilize a probabilistic machine learning classifier; and
in predicting whether the given configuration is the specified configuration, the program code further causes said at least one processing device to perform the step of inputting the data to the probabilistic machine learning classifier to determine and re-determine whether the given configuration one of meets and exceeds the probability threshold.

* * * * *